United States Patent
Astoria et al.

(10) Patent No.: US 11,788,159 B2
(45) Date of Patent: Oct. 17, 2023

(54) INTEGRATION OF DR PLANT AND ELECTRIC DRI MELTING FURNACE FOR PRODUCING HIGH PERFORMANCE IRON

(71) Applicant: Midrex Technologies, Inc., Charlotte, NC (US)

(72) Inventors: Todd Michael Astoria, Harrisburg, NC (US); Haruyasu Michishita, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 45 days.

(21) Appl. No.: 17/209,706

(22) Filed: Mar. 23, 2021

(65) Prior Publication Data

US 2021/0301359 A1    Sep. 30, 2021

Related U.S. Application Data

(60) Provisional application No. 62/993,787, filed on Mar. 24, 2020.

(51) Int. Cl.
C21B 13/00    (2006.01)
C21B 13/12    (2006.01)
(Continued)

(52) U.S. Cl.
CPC ...... *C21B 13/0073* (2013.01); *C21B 13/0093* (2013.01); *C21B 13/023* (2013.01);
(Continued)

(58) Field of Classification Search
CPC ............ C21B 13/0073; C21B 13/0093; C21B 13/023; C21B 13/12; C21B 13/14;
(Continued)

(56) References Cited

U.S. PATENT DOCUMENTS

| 4,691,900 A | 9/1987 | Maeda |
| 6,214,086 B1 | 4/2001 | Montague et al. |

(Continued)

FOREIGN PATENT DOCUMENTS

| CN | 1345381 A | 4/2002 |
| CN | 1894426 A | 1/2007 |

(Continued)

OTHER PUBLICATIONS

Jun. 4, 2021 International Search Report issued on International Application No. PCT/US21/23802.
Jul. 25, 2023 Office Action issued in Corresponding CN Application No. 202180023170.X.

(Continued)

*Primary Examiner* — Brian D Walck
*Assistant Examiner* — Danielle Carda
(74) *Attorney, Agent, or Firm* — Clements Bernard Walker; Christopher L. Bernard; Christine Wilkes Beninati

(57) ABSTRACT

A direct reduction process comprises providing a shaft furnace of a direct reduction plant to reduce iron oxide with reducing gas; providing a direct reduced iron melting furnace; and coupling a discharge chute between a discharge exit of the direct reduced shaft furnace and an inlet of the direct reduced iron melting furnace; wherein direct reduced iron and the reducing gas from the shaft furnace flow through the discharge chute and the reducing gas controls the melting furnace atmosphere to reducing environment.

23 Claims, 5 Drawing Sheets

(51) Int. Cl.
*C21B 13/02* (2006.01)
*C21B 13/14* (2006.01)

(52) U.S. Cl.
CPC .............. *C21B 13/12* (2013.01); *C21B 13/14* (2013.01); *C21B 2100/44* (2017.05); *C21B 2100/64* (2017.05); *C21B 2100/66* (2017.05)

(58) Field of Classification Search
CPC ............ C21B 2100/44; C21B 2100/64; C21B 2100/66; C21B 13/02; C21B 13/002; C21B 13/143; Y02P 10/20; Y02P 10/134; C21C 5/52
USPC .......................................................... 75/505
See application file for complete search history.

(56) References Cited

U.S. PATENT DOCUMENTS

| | | |
|---|---|---|
| 6,685,761 B1 | 2/2004 | Hoffman et al. |
| 2003/0097908 A1 | 5/2003 | Hoffman et al. |
| 2008/0236335 A1 | 10/2008 | Metius et al. |
| 2009/0051083 A1* | 2/2009 | Vrech ....................... F27B 1/21 266/176 |
| 2018/0134507 A1 | 5/2018 | Lucas et al. |
| 2018/0274047 A1 | 9/2018 | Memoli et al. |

FOREIGN PATENT DOCUMENTS

| | | | | |
|---|---|---|---|---|
| EP | 1127171 B1 * | 6/2003 | ........... | C21B 13/085 |
| EP | 3269830 A1 * | 1/2018 | ........... | C21B 13/004 |
| JP | 2016141873 A | 8/2016 | | |

* cited by examiner

US 11,788,159 B2

INTEGRATION OF DR PLANT AND ELECTRIC DRI MELTING FURNACE FOR PRODUCING HIGH PERFORMANCE IRON

CROSS-REFERENCE TO RELATED APPLICATION

The present non-provisional patent application claims the benefit of priority of U.S. Provisional Patent Application No. 62/993,787, filed on Mar. 24, 2020, and entitled "MIDREX PROCESS FOR PRODUCING HIGH PERFORMANCE IRON," the contents of which are incorporated in full by reference herein.

TECHNICAL FIELD

The present invention relates generally to the direct reduced iron (DRI) and steelmaking fields, where DRI is commonly understood to include cold direct reduced iron (CDRI), hot direct reduced iron (HDRI), and hot briquetted iron (HBI). More specifically, the present invention relates to a method and system to integrate the melting step of a DRI production process with the DRI production step.

BACKGROUND

The blast furnace (BF)-basic oxygen furnace (BOF) process route has been the most predominant method globally for producing crude steel, but is a major source for $CO_2$ emissions. Steelmaking with an electric arc furnace (EAF) using scrap is a prospective alternative to the BF-BOF process due to its lower $CO_2$ emission intensity. However, high-quality steel product equivalent to what is commonly termed BF grade product restricts the amount of tramp element such as copper derived from the scrap. For EAF to meet the quality requirement, clean iron units such as direct reduced iron (DRI) and/or pig iron are commonly added to the scrap in EAF feedstock to dilute the amount of the tramp material. A transition from BF-BOF production to EAF places more pressure on the clean iron units supply as the availability of clean scrap becomes tighter and gangue free BF pig iron availability drops due to its higher $CO_2$ footprint.

DRI reduced by natural gas has a lower $CO_2$ footprint and can provide an alternative source of clean iron unit for the EAF while maintaining lower $CO_2$ emissions over the blast furnace. However, unlike the BF process, the gangue contained in the iron ore cannot be removed under solid-gas reaction within the prevalent direct reduction processes employed presently. DRI containing higher acid gangues is not preferable at the EAF since a larger amount of slag increases the operation cost and decreases the productivity. This is the reason most of the DRI currently used at EAF is made of the high-quality iron ore, termed DR grade iron ore, typically containing iron content >67%. However, the depletion of the DR grade iron ore is a concern for the future, which may negatively impact the productions shift from BF-BOF to EAF progresses.

To remove the gangue in slag form, the material is melted after reducing the iron oxide using processes such as BF or EAF. The production of the slag free clean iron unit after melting DRI made of the low-grade iron oxide, typically termed "high performance iron (HPI)", is demanded for the downstream EAF mills to produce the high-quality steel product with the scrap. The availability of HPI is believed to significantly contribute to global $CO_2$ reduction by enhancing EAF steelmaking with the obsolete scrap more commonly available.

Currently, the DRI made of DR grade oxide pellet is almost 100% of the feedstock for the EAF where little scrap is available, such as in Middle East. However, in the case of using the DRI made of lower grade oxide pellets with conventional EAF to produce liquid steel or HPI, the higher gangue content in the DRI increases the slag volume, which increases the operating cost and decreases the productivity at EAF, as explained below.

The slag chemistry must be controlled to maintain the proper steel quality at the EAF. The slag basicity is typically 2.0 or higher to control the sulfur and phosphorous content in the product steel under the oxidized atmosphere. Since most of the gangue in DRI is acid, the basic flux agent added to the DRI to maintain the higher basicity further increases the slag volume.

The additional slag leads to the higher iron yield loss since some iron will be lost in the form of FeO saturated in the slag at more than 20% under the oxidizing atmosphere at the EAF. These larger slag volumes also increase the electrical consumption and the slag removal efforts, which results in a longer tap to tap time and lower productivity at the EAF. For example, the slag volume is about 100 to 150 kg slag/ton steel when the DRI made of DR grade iron oxide is melted at the EAF. It can be as high as about 400 to 500 kg slag/ton steel when the DRI made of the lower grade iron oxide is melted at the EAF.

BRIEF SUMMARY OF THE INVENTION

Exemplary embodiments of the present invention disclose a method and system to integrate the melting step with the production step of the DRI resulting in improved processing and addressing the problems noted above. Advantageously, the overall benefit is for the processing of a wider range of iron ores, especially lower grade iron ores containing the gangues content higher than DR grade iron ores, while maintain high overall energy efficiency, material yield and productivity.

Thus, in order to produce HPI with the lower operation cost and higher productivity, the following objectives and advantages are achieved by embodiments of the invention: 1) maintain the reduced atmosphere controlling the positive internal pressure at the DRI melting furnace in stable a manner; the pressure set point must be high enough to prevent the air infiltration possibly leading to explosion; 2) maintain the higher residual carbon in DRI without causing the fines loss during the handling of DRI between DR plant and the DRI melting furnace, due to the lower physical strength of the DRI containing high carbon, in general; and 3) efficiently use the chemical and sensible energy in the offgas from the DRI melting furnace when the DRI of the higher residual carbon is melted under the reducing atmosphere.

In an exemplary embodiment, the present invention discloses a direct reduction process. The process comprises: providing a DRI melting furnace; and coupling a discharge chute between a discharge exit of the direct reduced shaft furnace and an inlet of the DRI melting furnace; wherein DRI and the reducing gas from the shaft furnace flow through the discharge chute and the reducing gas controls the melting furnace atmosphere to reducing environment. The discharge chute can comprise a DRI discharge chute and a DRI feed chute. The process can further comprise providing an interconnecting duct between the DRI melting furnace and the shaft furnace to recycle offgas from the melting furnace to the direct reduction plant. The offgas from the DRI melting furnace can be recycled in at least one of the following offgas recycle lines: a recycle line from the DRI melting furnace to the shaft furnace between a shaft furnace bustle and top of burden, a recycle line from the DRI melting furnace to a top of the shaft furnace, and a recycle line from the DRI melting furnace to a top gas scrubber. The process can comprise providing a rotary feeder or a feed screw at the chute to control feed rate of the DRI from the shaft furnace to the DRI melting furnace. The process can comprise providing a choke feed discharge chute to transfer the DRI to make a pile according to an angle of response in the DRI melting furnace. The process can comprise providing a pressure control damper in at least one of the offgas recycle lines to control internal pressure of the DRI melting furnace and connection of cold dilution gas at offgas offtake of the DRI melting furnace, wherein the cold dilution gas is removed from at least one of the following cold gas sources at the direct reduction plant: an outlet of a reformed gas cooler; an outlet of a direct recycle cooler; and an outlet of a process gas compressor; and wherein offgas from the DRI melting furnace is diluted by the cold dilution gas to lower the offgas temperature at the furnace offgas offtake to prevent dust from building up in the off gas recycle lines. The process can comprise providing a hot reducing gas line from a reformer outlet to the DRI melting furnace to control internal pressure of the DRI melting furnace. To allow the offgas to flow from the DRI melting furnace to the DR plant, the DRI melting furnace can operate at positive pressure, at least 0.3 barg or greater than 1.3 barg, depending where the offgas is recycled. Slag and hot metal can be tapped from the DRI melting furnace using separate tapping holes or the slag and hot metal are tapped from the same tap hole. The process can comprise providing a wet scrubber to clean and cool the offgas from the DRI melting furnace, and a pressure control damper and/or a compressor to control internal pressure of the DRI melting furnace, and located in the offgas recycle line from the DRI melting furnace to the shaft furnace. Optionally with the arrangement, the DRI melting furnace can be operated at the pressure lower than 0.3 barg. Flux can be added in oxide pellets before being charged into the shaft furnace. Coal or other carbonaceous material can be injected into the DRI melting furnace and a portion of the cold gas can be used to pneumatically convey the coal or other carbonaceous material into the direct reduced iron melting furnace. A portion of the cold gas can be used as seal gas for dynamic sealing around the DRI melting furnace, such as a pressure equalizing gas at a lock hopper to charge the flux and/or carbonaceous material to the DRI melting furnace.

In another exemplary embodiment, the present invention discloses a direct reduction system. The system comprises: a shaft furnace of a direct reduction plant configured to reduce iron oxide with reducing gas; a DRI melting furnace; and a discharge chute coupled between a discharge exit of the DRI shaft furnace and an inlet of the DRI melting furnace; wherein the DRI and the reducing gas from the shaft furnace flow through the discharge chute and the reducing gas controls the melting furnace atmosphere to reducing environment. The system can further comprise an interconnecting duct between the DRI melting furnace and the shaft furnace configured to recycle offgas from the melting furnace to the direct reduction plant. The DRI melting furnace can be an electric arc furnace or a submerged arc furnace. The offgas from the DRI melting furnace can be configured to be recycled in at least one of the following off gas recycle lines: a recycle line from the DRI melting furnace to the shaft furnace between a shaft furnace bustle and top of burden, a recycle line from the DRI melting furnace to a top of the shaft furnace, and a recycle line from the DRI melting furnace to a top gas scrubber. The system can comprise a rotary feeder or a feed screw installed at the chute and configured to control feed rate of the DRI from the shaft furnace to the DRI melting furnace. The system can comprise a choke feed discharge chute configured to transfer the DRI to make a pile according to an angle of repose in the DRI melting furnace. The system can comprise a pressure control damper in at least one of the offgas recycle lines configured to control internal pressure of the DRI melting furnace and connection of cold dilution gas at offgas offtake of the DRI melting furnace, wherein the cold dilution gas is configured to be removed from at least one of the following cold gas sources at the direct reduction plant: an outlet of a reformed gas cooler; an outlet of a direct recycle cooler; and an outlet of a process gas compressor. The system can comprise a hot reducing gas line from a reformer outlet to the DRI melting furnace configured to control internal pressure of the DRI melting furnace. The system can comprise a wet scrubber configured to clean and cool the offgas from the DRI melting furnace, and a pressure control damper and/or a compressor configured to control internal pressure of the DRI melting furnace, and located in the offgas recycle line from the DRI melting furnace to the shaft furnace. The discharge chute can comprise a DRI discharge chute and a DRI feed chute.

In a further exemplary embodiment, the present invention discloses a process to produce high performance iron including cast iron or hot metal with a direct reduction plant integrated with a DRI melting furnace. The process comprises: charging direct reduced iron directly from the shaft furnace to the DRI melting furnace through an interconnecting chute; controlling the melting furnace atmosphere to reducing environment by introducing reducing gas from the shaft furnace to the DRI melting furnace through the interconnecting chute; and recycling offgas from the DRI melting furnace to the direct reduction plant through the interconnecting duct between the DRI melting furnace and the shaft furnace.

BRIEF DESCRIPTION OF THE DRAWINGS

The present disclosure is illustrated and described with reference to the various drawings, in which like reference numbers are used to denote like method steps/system/apparatus components, as appropriate, and in which.

DETAILED DESCRIPTION OF THE INVENTION

To reduce the slag volume in producing HPI, it is advantageous to apply a two step process; firstly producing the hot metal or cold pig iron after melting the DRI and removing the slag, and secondarily decarburizing the carbon in the first iron product and producing the liquid steel with the additional scrap in a separate melting furnace downstream. The first melting step of DRI can be similar to what the conventional blast furnace practices; i.e. producing the hot metal with the lower grade iron ore under the reducing atmosphere to maintain FeO %<1% in the slag and the slag basicity of about 1.0 to 1.3 lower than the case of the steelmaking at EAF.

To maintain a lower FeO % under the reducing atmosphere, the carbon dissolved in the molten hot metal must be high enough, typically around 4%. To achieve this level, the residual carbon amount in DRI should be high enough since the carbon material added externally to make up the carbon results in the lower yield at the EAF, due to the entrained loss by offgas or slag losses. In addition, the clean or sulfur-free carbon material is expensive and increases the operating cost. Therefore, it is desirable to minimize the amount of the external carbon addition for the adjustment to meet the target carbon level in the hot metal.

The second steelmaking step can be done at the conventional EAF. Therefore, according to the above, an advantage of the two step process is to maintain the reduced atmosphere and the high residual carbon in the DRI feedstock, at the first melting step. Furthermore, the offgas from the first melting step at the EAF should have the high sensible and chemical energy when the reduced atmosphere can be maintained. Thus, another advantage is the effective use of the energy available in the offgas.

It is noted that the conventional EAF typically operates at a near atmospheric or slightly negative pressure, and in an oxidizing gas condition where the supplemental chemical combustion energy by oxygen blowing with coal or other carbonaceous material injection and natural gas burners has been applied with a combination of electrical energy.

Figure 1:
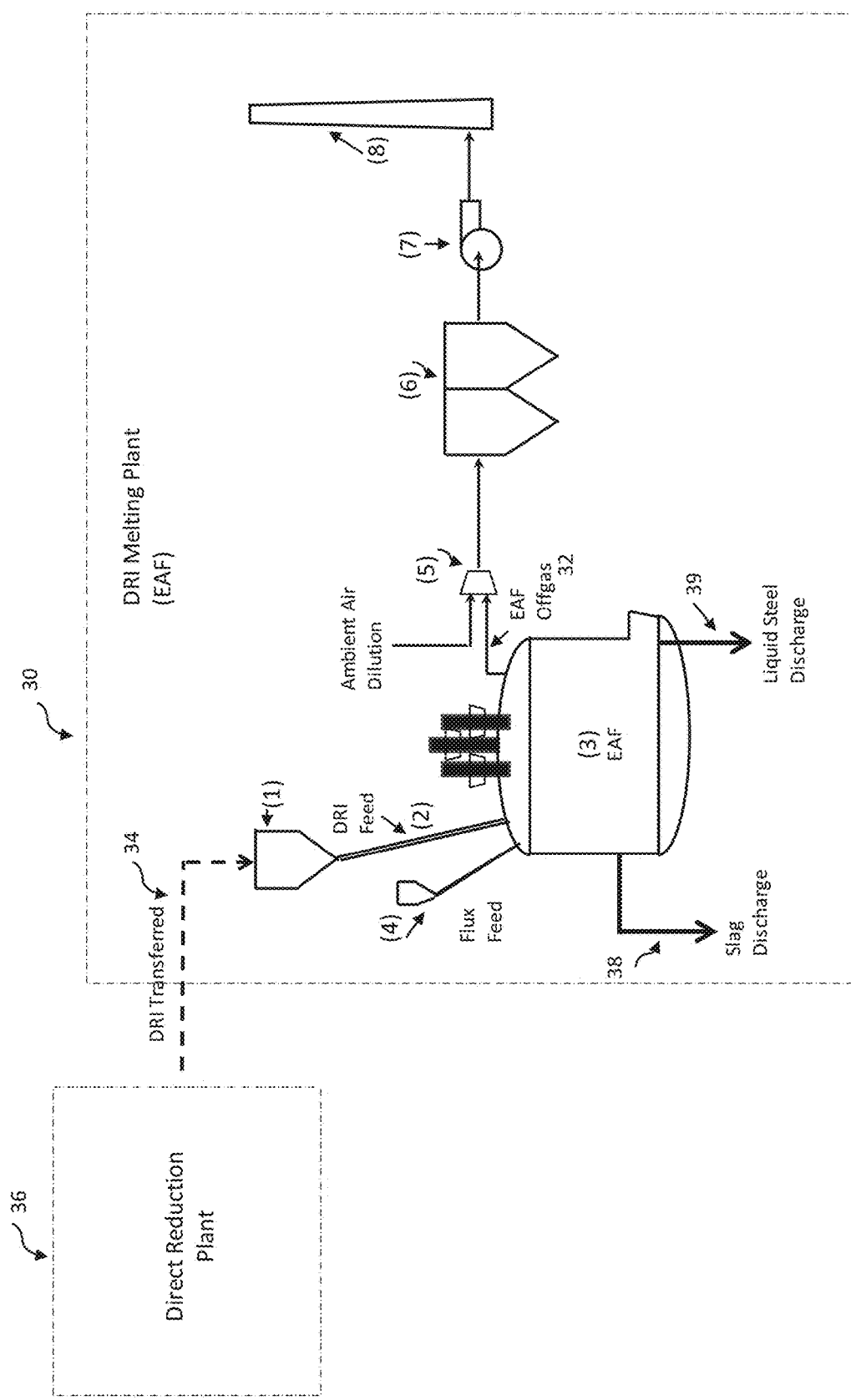
FIG. 1 is a schematic diagram illustrating one embodiment of the prior art; the independent EAF applied for melting the DRI.

Referring specifically to FIG. 1, FIG. 1 is schematic diagram illustrating one embodiment of the prior art; the independent EAF applied for melting the DRI. As shown in the system/process 30 of FIG. 1, the oxidizing EAF offgas 32 is normally diluted with the ambient air at the dilution hood 5 immediately after coming off EAF unit 3 and then dedusted by bag filter 6 before being discharged to the ambient through the ID fan 7 and the stack 8. Therefore, the offgas having high sensible and chemical energy generated at the first melting step will significantly increase the process duty, but the energy in the offgas cannot be effectively utilized when the conventional EAF offgas system shown in FIG. 1 is applied. FIG. 1 further schematically illustrates a flow of DRI 34 transferred from a direct reduction plant 36 into DRI feed bin 1. The DRI flows from the DRI feed bin via feed chute 2 to the EAF 3, with flux feed 4 coupled thereto. FIG. 1 further illustrates slag discharge flow 38 and liquid steel discharge flow 39 exiting the bottom of the EAF 3.

US Pat. Appln. Publ. No. US2018/0274047 to Memoli et al. discloses a method to produce the pig iron from DRI having higher metallization (>90%) and residual carbon (>2.8%) in a EAF subjected to a positive internal pressure generated by gases produced by reduction reaction taking place in the EAF. With the concept that the gases generated by the reaction between the residual FeO and carbon in the DRI only drives a positive pressure at EAF, the amount of the generated gases is limited when the highly metallized DRI of low residual FeO is charged to the EAF operated under the reducing atmosphere. Unlike the conventional EAF where the negative pressure is maintained by infiltrating a lot of ambient air, it seems difficult in US Pat. Appln. Publ. No. US2018/0274047 to control the positive pressure with the limited amount of gases generated in the EAF. The internal pressure at EAF fluctuates since the operations such as DRI feeding, tapping the hot metal and discharging the slag take place in the intermittent fashion. Without involving more volume of gas at the higher positive pressure set point, it seems difficult to continuously prevent the air infiltration which may potentially lead to an explosion.

US Pat. Appln. Publ. No. US2018/0274047 does not appear to describe offgas system improvement, but the chemical energy by the evolved CO in EAF offgas would be lost when the conventional EAF offgas system shown in FIG. 1 is applied. When the EAF is operated under the reduced atmosphere and the cast iron (high carbon hot metal) is produced, most of the offgas would be CO.

Also, the higher residual carbon in the DRI reduces the physical strength and generates a lot of fines during the handling or transportation of the DRI. It is more desirable to eliminate or minimize the DRI handling between DR plant and the EAF when the residual carbon in the DRI is higher.

Generally, a DR plant reduces the iron ore to produce DRI using natural gas as the reductant source, where the oxygen is removed from the iron oxide, but the gangue remains in the product DRI. EAF melts the DRI to produce the liquid steel using the electricity as the energy source. As FIG. 1 shows a flowsheet/schematic for a prior art system, in the state-of-the-art DR-EAF route the DR plant and the EAF have entirely separate gas systems. The DR plant seals the reducing gasses into the reduction shaft furnace. The EAF then operates with a completely independent atmosphere that is cleaned and exhausted to the ambient. In this arrangement, it is difficult to control the reducing atmosphere in the EAF that will minimize the iron yield loss to the slag.

Accordingly, in one exemplary embodiment, the present invention provides a system with the DR plant and the DRI melting furnace closely coupled, where the hot DRI can be directly charged from the DR plant to the DRI melting furnace. The reducing gas is allowed to flow from the DR plant into the DRI melting furnace through the DRI discharge chute and the offgas from the DRI melting furnace can be recycled to the DR plant. Advantageous of this embodiment/flowsheet include: direct connection through the DRI discharge chute between the DR plant and the DRI melting furnace eliminates the DRI handling/transportation between these systems and minimizes the temperature drop, the metallization/carbon loss and the fines loss even though the higher residual carbon in DRI tends to reduce the physical strength of the DRI; the atmosphere of the DRI melting furnace can be controlled to a reducing environment by introducing the reducing gas generated in the DR plant into the DRI melting furnace; the DRI melting furnace operates at positive pressure, at least 0.3 barg and preferably greater than 1.3 barg to allow the offgas to flow from the DRI melting furnace to the DR plant, by introducing the reducing gas; the reducing gas environment at the DRI melting furnace and charging the DRI of the higher residual carbon with minimum fines loss allow production of the hot metal having the higher carbon content similar to that in the hot metal produced by blast furnace—it will reduce FeO % in the slag as well as the slag basicity to minimize iron yield loss to the slag, and the higher transfer rate of sulfur from the molten iron to the slag under the reducing atmosphere enables to apply the lower slag basicity similar to that for blast furnace hot metal in melting the DRI at the DRI melting furnace; less slag volume with the lower slag results in the lower electricity consumption and the higher productivity at the DRI melting furnace; the high pressure in the DRI melting furnace allows the high quality and high temperature offgas to be recycled and used directly in the DR plant and the recycle of the offgas of the DRI melting furnace to the DR plant allows for high energy efficiency.

In another exemplary embodiment, the offgas from the DRI melting furnace can be recycled to several different locations in the DR plant as follows. Recycle Option 1; a preferred location between the DR Plant shaft furnace bustle and the top of the burden. This allows for the reducing potential of the gas and the sensible heat to be directly used in the DR process for maximum efficiency. Recycle Option 2; an option to recycle the offgas to the top of the DR plant shaft furnace. Recycle Option 3; an option to recycle the offgas to the top gas scrubber of the DR plant.

In another exemplary embodiment, the hot metal and slag can be discharged from the DRI melting furnace with the following variation at the DRI discharge chute: 1) One variation is to tap the slag and hot metal from the DRI melting furnace according to the standard EAF practice using separate tapping holes; and 2) The preferred variation is to tap the hot metal and slag from the same tap hole, and then use a slag skimmer to separate the slag from the hot metal as is common in the Blast Furnace process.

In another exemplary embodiment, the flow of the DRI from the DR plant into the DRI melting furnace is controlled with the following variation at the DRI discharge chute: 1) A physical device such as a rotary feeder, or feed screw can be used to control the flow rate of DRI without impacting the gas flow; and 2) The DRI could also make a pile according to the angle of repose in the DRI melting furnace. As the DRI is melted then the DRI will naturally flow into the DRI melting furnace to re-establish the pile.

In another exemplary embodiment, the offgas from the DRI melting furnace would be diluted at the offtake by the cold gas to lower the offgas temperature to prevent the dust from building up on the offgas line. This allows to control the internal pressure of the DRI melting furnace using the damper installed at the offgas line. The following options of the cold gas source from the DR plant are available. Cold Gas Option 1; a preferred cold gas introduced from the outlet of the reformed gas cooler since it is most reducing gas. Cold Gas Option 2; an optional cold gas introduced from the outlet of the direct recycle cooler since it is second most reducing gas. Cold Gas Option 3; an optional cold process gas introduced from the outlet of the process gas compressor.

In another exemplary embodiment, coal or other carbonaceous material can be injected into the DRI melting furnace. In this application a portion of one of the above-mentioned cold gas from the DR plant is used to pneumatically convey the coal or other carbonaceous material into the DRI melting furnace. In the conventional technology nitrogen is used to pneumatically convey the coal or other carbonaceous material into the DRI melting furnace, but the nitrogen will be built up in the reducing gas loop at the DR plant when the offgas from DRI melting furnace is recycled to the DR plant.

In another exemplary embodiment, a portion of one of the above-mentioned cold gas from the DR plant is used as the seal gas for the dynamic sealing around the DRI melting furnace, such as the pressure equalizing gas at the lock hopper to charge the flux and/or carbonaceous material. In the conventional technology nitrogen is used for the seal gas around the DRI melting furnace, but the nitrogen will be built up in the reducing gas loop at the DR plant when the offgas from the DRI melting furnace is recycled to the DR plant.

In another exemplary embodiment, the offgas from the DRI melting furnace would be dedusted with the wet scrubber after coming out of the DRI melting furnace to remove the dust entrained in the offgas to prevent the dust from building up on the offgas line. The pressure control damper and/or compressor will be installed in the downstream of the wet scrubber to control the internal pressure of the DRI melting furnace. Optionally with the compressor arrangement, the DRI melting furnace can be operated at the internal pressure lower than 0.3 barg.

In another exemplary embodiment, the internal pressure of the DRI melting furnace would be controlled by introducing the controlled amount of the hot reducing gas taken from downstream of the reformer into the DRI melting furnace.

In another exemplary embodiment, the flux is added in the oxide pellet before being charged into the shaft furnace to avoid charging the flux at the pressurized the DRI melting furnace with the lock hopper type system.

Figure 2:
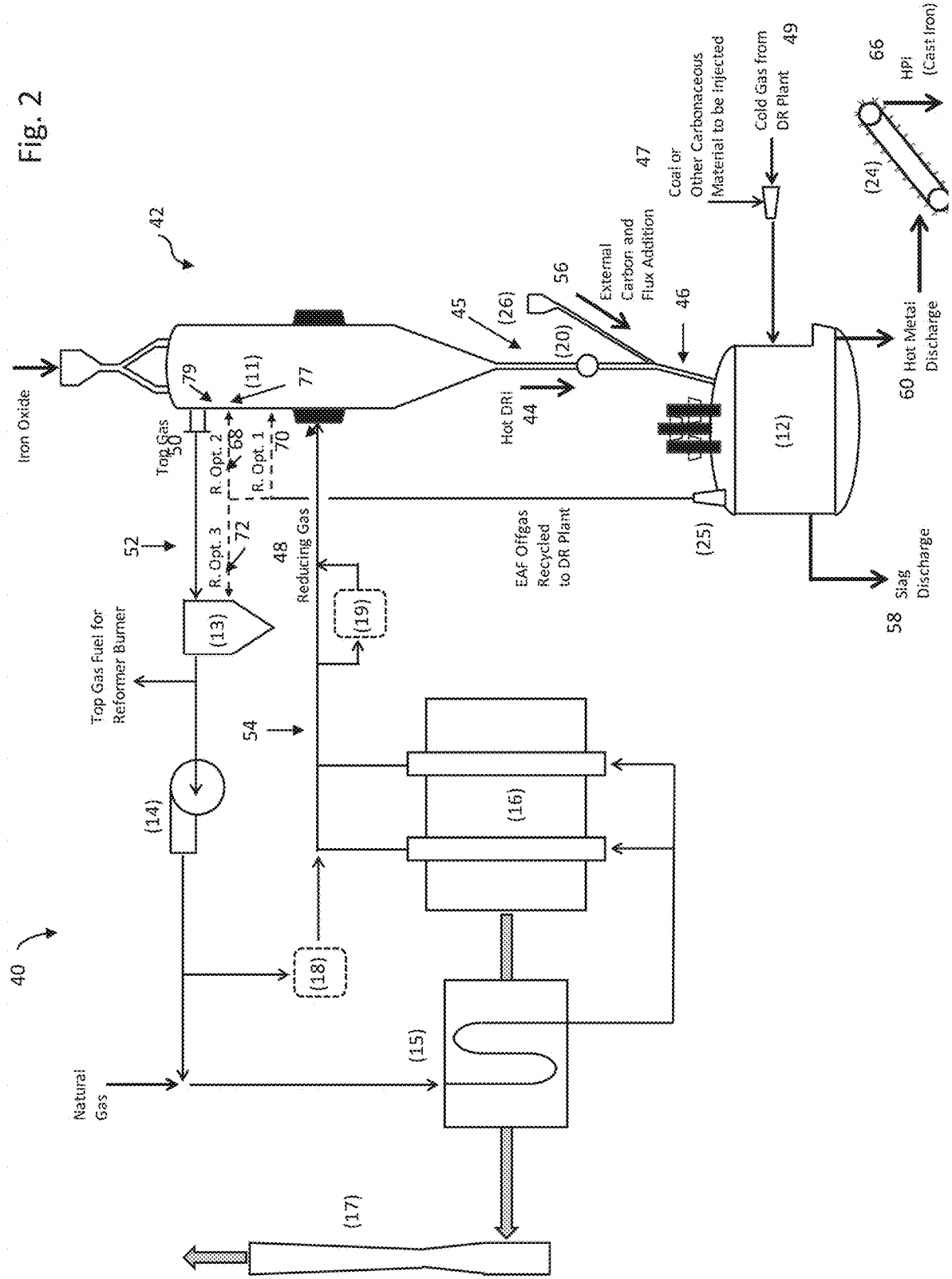
FIG. 2 is a schematic diagram illustrating one exemplary embodiment of the direct reduction and melting process/system of the present invention.

Referring specifically to FIG. 2, FIG. 2 shows a schematic diagram for the process/system 40 with the DR plant and the DRI melting furnace closely coupled. As shown in FIG. 2, the DR plant 42 includes a shaft furnace 11, a top gas scrubber 13, one or more gas compressors 14, a reformer feed gas preheater (heat exchanger) 15, a flue gas stack 17 and a reformer 16. The iron oxide is charged at the top of the shaft furnace 11, reduced and carburized with the hot reducing gas in the counter-current moving bed in the shaft furnace 11. DRI is discharged from the bottom of the shaft furnace 11 as shown by DRI flow 44 and transferred to the DRI melting furnace 12 through the direct connected discharge chute 46. The DRI discharge chute 45 can be coupled to a discharge exit of DRI from the shaft furnace 11 and a DRI feed chute 46. The discharge rate of the DRI is controlled by a physical device 20 such as a rotary feeder or feed screw. Or, as an option, the DRI could be choke-fed through the discharge chute 45 or make a pile according to the angle of repose in the DRI melting furnace 12, where the DRI will naturally flow into the DRI melting furnace 12 to re-establish the pile as the DRI is melted. The reducing gas 48 flows down from the shaft furnace 11 to the DRI melting furnace 12 through the packed DRI bed in the discharge chute 45 in accordance with the pressure balance since no mechanical sealing device is installed. Shaft furnace top gas 50 containing the reduction products is recycled from the shaft furnace 11 to the top gas scrubber 13. A part of the scrubbed gas is sent to the reformer 16 burner system as a fuel source. The remaining scrubbed gas is directed to one or more compressors 14. The compressed gas is mixed with natural gas before being directed to the feed gas preheater (heat exchanger) 15 that is arranged to capture heat from the flue gas from the reformer 16 to the flue gas stack 17. The preheated feed gas is directed to the reformer 16, where the hydrocarbon such as methane in the feed gas is catalytically reformed to H2 and CO to make-up the reductant to reduce the iron oxide in the shaft furnace 11. The reformed gas exiting the reformer 16 is sent to the shaft furnace 11 via flow 54, as the reducing gas. Typically, the reducing gas entering the shaft furnace 11 is about 900 to 1000° C. at about 1.3 to 2.0 barg under and the shaft furnace top gas 50 is about 300 to 350° C. at about 0.3 to 1.0 barg, under the normal operating condition.

During the start-up, the reducing gas temperature is controlled at the lower level while the reformer 16 cannot tolerate the lower temperature operation to avoid the carbon deposition on the catalyst. So, the DR plant 42 usually has the measure to cool the reducing gas 48 with either the reformed gas cooler 19 or the direct recycle cooler 18. These coolers are packed bed type cooler and in operation only during the start-up although they can be in operation whenever required.

The DRI discharged from the shaft furnace 11 is fed to the DRI melting furnace 12 together with the reducing gas from the shaft furnace 11. The flux as well as the additional carbon material 56 will be parallelly charged from the flux/carbon storage silo 26, where the feed system needs to have the function to feed the material into the DRI melting furnace 12 operating at the higher pressure, such as the lock hopper type system using the inert or reducing gas for the pressure equalization. Optionally, the flux can be added in the oxide pellet at the pelletizing step before being charged to the shaft furnace 11 as commonly done for the blast furnace feed. This will eliminate the lock hopper system and improve the flux yield at the DRI melting furnace. Also, the coal or other carbonaceous material can be injected into the DRI melting furnace 12 with the carrier gas which is the cold reducing gas taken from the DR plant 42.

With the DRI melting furnace 12, the DRI is melted to allow the slag to be separated from the metal. The slag and the hot metal will be tapped from the DRI melting furnace 12 according to the standard practice at the conventional EAF using separate tapping holes. Slag discharge 58 and hot metal discharge 60 is illustrated in FIG. 2. Or, as an alternative, the hot metal and slag will be tapped from the same tap hole, and then use a slag skimmer to separate the slag from the hot metal as is common in the blast furnace process.

The hot metal of which the physical/chemical properties are similar to those of the hot metal produced by the blast furnace. With the pig caster 24 following the DRI melting furnace, the hot metal discharged from the DRI melting furnace can be converted to the pig iron (cast iron) so that the iron product can be transported to the clients. Unlike the conventional DRI, the iron product is the slag free clean iron made of the low-grade iron oxide having the low $CO_2$ footprint, what is termed "high performance iron (HPI)" as shown at 66 in FIG. 2.

The process/system 40 with the DR plant 42 and the DRI melting furnace 12 closely coupled according to embodiments enables production of the HPI with the lower operation cost and higher productivity, as more specifically explained in the below.

Direct connection through the DRI charge chute 45 between the shaft furnace 11 and the DRI melting furnace 12 eliminates the DRI handling/transportation between these systems and minimizes the temperature drop, the metallization/carbon loss and the fines loss. This is especially effective when the DRI has the higher residual carbon since the strength of the DRI tends to come down as the carbon content in DRI increases.

The atmosphere inside the DRI melting furnace 12 can be controlled to a reducing environment by introducing the reducing gas generated in the shaft furnace 11 through the DRI discharge chute 45. The DRI melting furnace 12 operates at positive pressure, at least 0.3 barg and preferably greater than 1.3 barg. This pressure level ensures to prevent the ambient air from being infiltrated into the DRI melting furnace 12 even though the pressure fluctuates during the operation cycle.

The reducing gas environment at the DRI melting furnace 12 and charging the DRI of the higher residual carbon with minimum fines loss allow production of the hot metal having the higher carbon content similar to that in the hot metal produced by blast furnace. It will reduce FeO % in the slag as well as the slag basicity to minimize iron yield loss to the slag, comparing with the conventional EAF operation. The higher transfer rate of sulfur from the molten iron to the slag under the reducing atmosphere enables application of the lower slag basicity similar to that for blast furnace hot metal.

Less slag volume with the lower slag results in the lower electricity consumption and the higher productivity at the DRI melting furnace 12.

The high pressure in the DRI melting furnace 12 allows the high quality and high temperature offgas from the melter to be recycled and used directly in the DR Plant. The recycle of the offgas from the DRI melting furnace 12 to the DR plant allows for high energy efficiency. Unlike the offgas from the conventional EAF, the offgas from the DRI melting furnace 12 to produce the hot metal under the reducing comprise mostly combustibles; $CO+H2>90\%$. Introducing the reducing gas from the shaft furnace 11, the estimated flow rate of the offgas from the DRI melting furnace 12 is 25.6 Nm3/ton DRI as shown in the Table II for the exemplary material balance under the specific condition, which corresponding to around 5% of H2+CO amount required to reduce 1 ton of the oxide. Therefore, it is more desirable to use the offgas as the reductant to reduce the iron oxide at DR plant rather than just burning it as a fuel.

Thus, in one exemplary embodiment, the offgas from the DRI melting furnace 12 can be recycled to several different locations in the DR plant 42, as shown below and in FIG. 2. The optimum location should be determined depending on the pressure, temperature, and the reducibility of the recycled offgas under the specific design condition. Recycle Option 1 shown at flow 70 in FIG. 2; a preferred location 77 between the DR plant shaft furnace bustle and the top of the burden. This allows for the reducing potential of the gas and the sensible heat to be directly used in the DR process for maximum efficiency. Recycle Option 2 shown at flow 68 in FIG. 2; an option to recycle the offgas from the DRI melting furnace 12 to the top 79 of the DR Plant shaft furnace. Recycle Option 3 shown at flow 72 in FIG. 2; an option to recycle the offgas from the DRI melting furnace 12 to the top gas scrubber 13 of the DR plant 42.

The temperature of the offgas exhausted from the DRI melting furnace 12 would be higher than 1200° C. even with the reducing gas introduced from the shaft furnace 11. The sticky dust entrained in the offgas could build up in the offgas line under the temperature. This will affect the measure to control the internal pressure of the DRI melting furnace 12 since the pressure control damper has to be installed in the offgas line.

Figure 3:
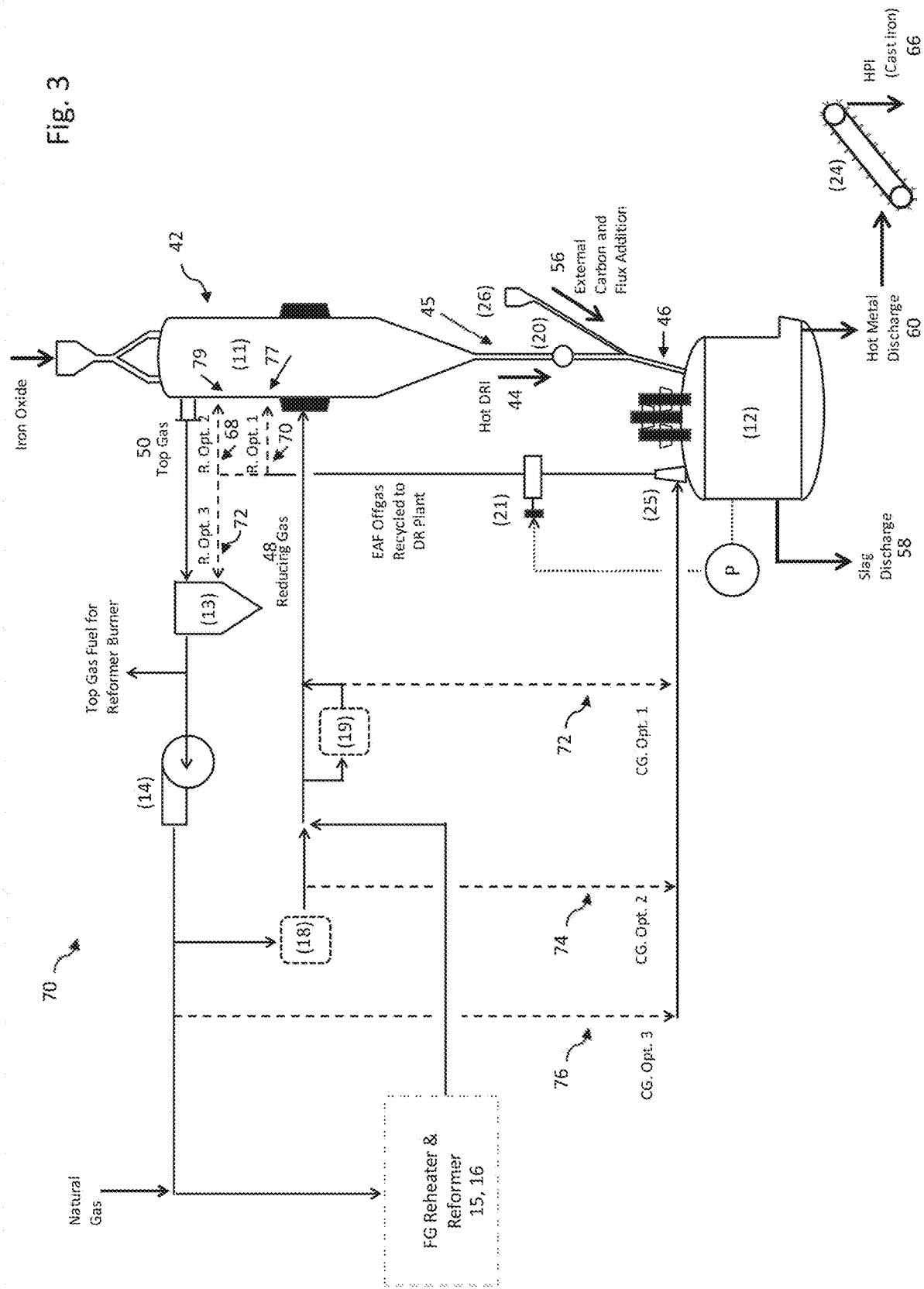
FIG. 3 is a schematic diagram illustrating one exemplary embodiment of the direct reduction and melting process/system of the present invention including the options to control the internal pressure of the DRI melting furnace with the cold gas from the DR plant.

Referring specifically to FIG. 3, FIG. 3 shows a schematic diagram for the exemplary embodiment of the direct reduction and melting process/system 70 of the present invention similar in aspects to FIG. 2, but also including the options to control the internal pressure of the DRI melting furnace 12 with the cold gas from the DR plant 42. Thus, the above descriptions of FIG. 2 regarding like features, conditions, flows and reference numbers are applicable.

As shown in FIG. 3, the offgas from the DRI melting furnace 12 would be diluted at the offtake 25 by the cold gas to lower the offgas temperature to prevent the dust from building up in the offgas line. This allows to control the internal pressure of the DRI melting furnace 12 using the damper 21 installed at the offgas line. The following options of the cold gas source from the DR plant 42 is available as described below and shown in FIG. 3. Cold Gas Option 1 shown at flow 72 in FIG. 3; a preferred cold gas introduced from the outlet of the reformed gas cooler 19 since it is most reducing gas. Cold Gas Option 2 shown at flow 74 in FIG. 3; an optional cold gas introduced from the outlet of the direct recycle cooler 18 since it is second most reducing gas. Cold Gas Option 3 shown at flow 76 in FIG. 3; an optional cold process gas introduced from the outlet of the process gas compressor 14.

It is noted that at most DR plants, either reformed gas cooler or direct recycle cooler is installed. They are only in operation at the oxide startup and idling under the normal operation, but can be continuously operated to provide the cold gas to the offgas offtake 25 at the DRI melting furnace 12.

Figure 4:
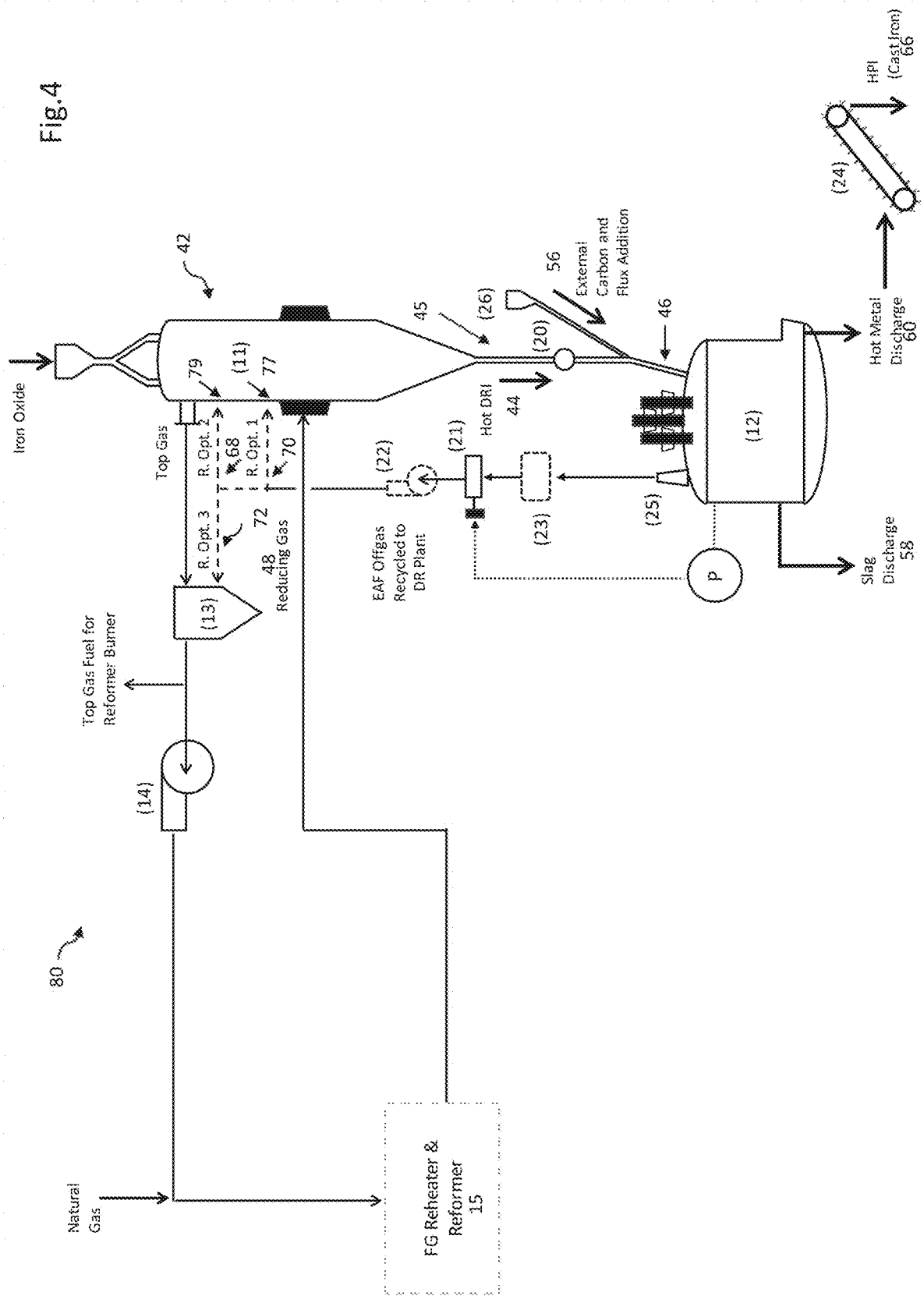
FIG. 4 is a schematic diagram illustrating one exemplary embodiment of the direct reduction and melting process/system of the present invention including the options to control the internal pressure of the DRI melting furnace with the wet scrubber and compressor.

Referring specifically to FIG. 4, FIG. 4 is a schematic diagram for the exemplary embodiment of the direct reduction and melting process/system 80 of the present invention similar in some aspects to FIGS. 2 and 3, but including the options to control the internal pressure of the DRI melting furnace with the wet scrubber and compressor. Thus, the above descriptions of FIGS. 2 and 3 regarding like features, conditions, flows and reference numbers are applicable.

As shown in FIG. 4, the offgas from the DRI melting furnace 12 would be dedusted with the wet scrubber 23 after coming out of the DRI melting furnace 12 to remove the dust entrained in the offgas to prevent the dust from building up on the offgas line. The pressure control damper 21 and/or compressor 22 will be installed in the downstream of the wet scrubber 23 to control the internal pressure of the DRI melting furnace 12. It is noted that embodiment may entail a higher capital investment, more equipment to maintain and a lower temperature of the offgas recycled. Optionally, with the compressor pressurizing the offgas recycled to the DR plant, the DRI melting furnace can be operated at a lower pressure less than 0.3 barg, making the DRI melting furnace easier to seal.

Figure 5:
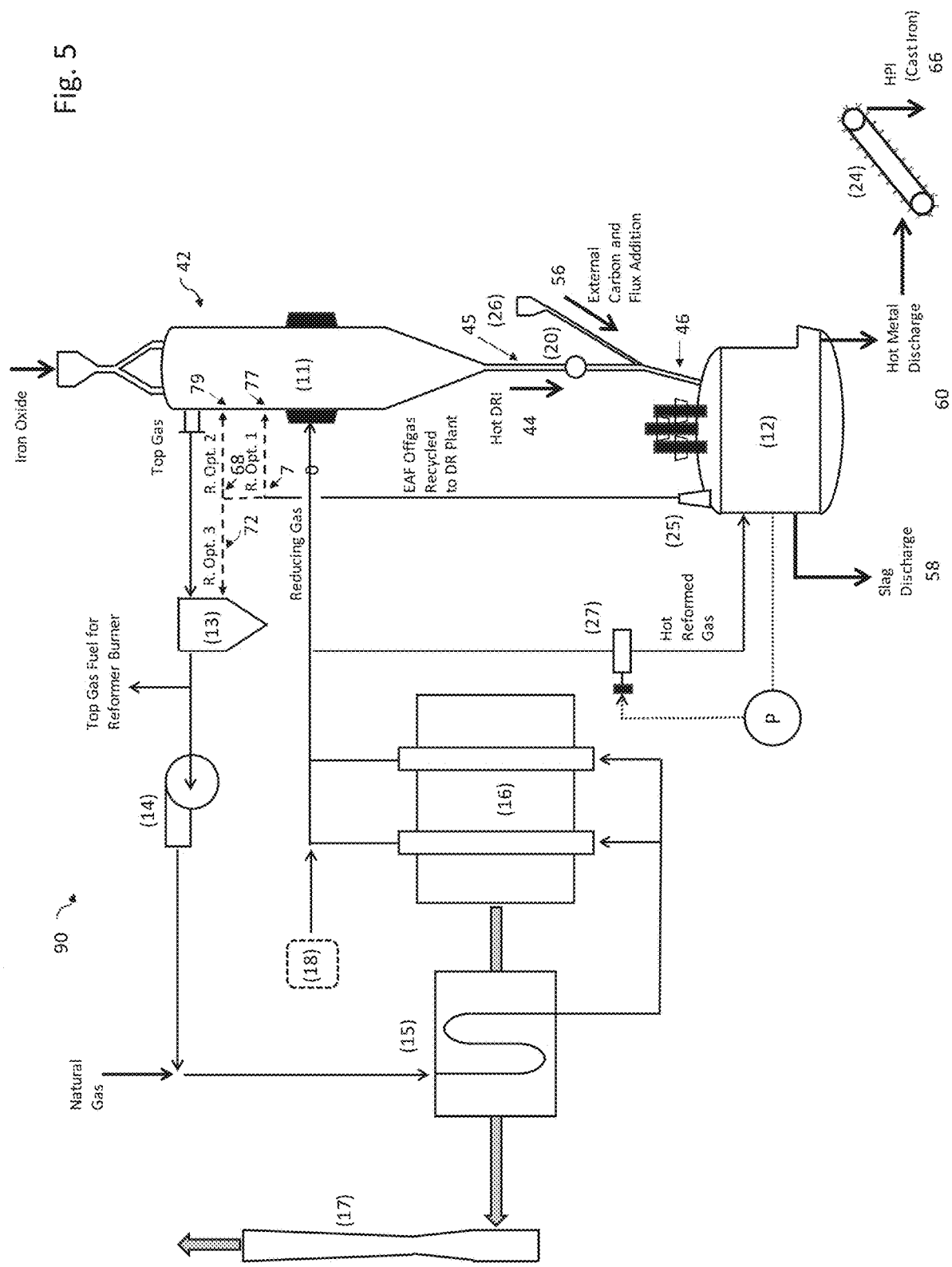
FIG. 5 is a schematic diagram illustrating one exemplary embodiment of the direct reduction and melting process/ system of the present invention including the options to control the internal pressure of the DRI melting furnace with the hot reformed gas.

Referring specifically to FIG. 5, FIG. 5 shows a schematic diagram for the exemplary embodiment of the direct reduction and melting process/system 90 of the present invention similar in some aspects to FIGS. 2, 3 and 4, but also including the options to control the internal pressure of the DRI melting furnace with the hot reformed gas. Thus, the above descriptions of FIGS. 2, 3 and 4 regarding like features, conditions, flows and reference numbers are applicable.

As shown in FIG. 5, the internal pressure of the DRI melting furnace 12 would be controlled by introducing the controlled amount of the hot reducing gas taken from downstream of the reformer 16 into the DRI melting furnace. Hot damper 27 to control the flow rate of the hot reducing gas from the reformer. This will eliminate the pressure control damper in the offgas line, but may not work well if the load of the sticky dusts are too high and dusts build up on the offgas line. It is noted that operation may be controlled so that load sticky dusts are not too high and dust does not build up in the offgas line. It is further noted that the additional pressure control line 27 could work with any of the offgas configurations from the offtake 25 of the DRI melting furnace 12 as described in other exemplary embodiments FIG. 2, FIG. 3, or FIG. 4.

In an exemplary embodiment and as shown in FIG. 2, coal or other carbonaceous material 47 can be injected into the DRI melting furnace 12. A portion of one of the above-mentioned cold gas from the DR plant (denoted at 49 in FIG. 2) can be used to pneumatically convey the coal or other carbonaceous material into the DRI melting furnace 12. In the conventional technology nitrogen is used to pneumatically convey the coal or other carbonaceous material into the DRI melting furnace 12, but the nitrogen will be built up in the reducing gas loop at the DR plant when the offgas from the DRI melting furnace 12 is recycled to the DR plant.

In another exemplary embodiment, a portion of one of the above-mentioned cold gas from the DR plant is used as the seal gas for the dynamic sealing around the DRI melting furnace 12, such as the pressure equalizing gas at the lock hopper to charge the flux and/or carbonaceous material from the charge hopper 26, as also best seen in FIG. 2. In the conventional technology nitrogen is used for the seal gas around the DRI melting furnace 12, but the nitrogen will be built up in the reducing gas loop at the DR plant when the offgas from the DRI melting furnace is recycled to the DR plant 42.

The exemplary material balance is shown below in case that the hot metal of 4.5% carbon is produced with the oxide pellet of 66% Fe content using the system with the DR Plant and the DRI melting furnace 12 closely coupled, according to embodiments. Assuming all the carbon to make 4.5% C in hot metal will be provided from the DRI without the external carbon addition, the metallization=95% and the residual carbon=5% is set for the DRI. The production rate for the DRI is 2 million tons per year or 250 tons per hour. The pressure difference between the bustle area of the shaft furnace 11 and the DRI melting furnace 12 is 1.4 bar, which drives the reducing gas down flowing through the discharge chute filled with the DRI between the shaft furnace 11 and the DRI melting furnace 12.

Table I shows the overall material balance with the oxide/DRI analysis. According to Table II set forth is the gas balance around the DRI melting furnace 12 under specific condition.

TABLE I

| | Overall Material Balance | | | | | | | | | |
|---|---|---|---|---|---|---|---|---|---|---|
| | Rate | | Chemical Analysis (%) | | | | | | | |
| | Hourly (ton/h) | Yearly (Mt/y) | T-Fe (%) | M-Fe (%) | C (%) | SiO2 (%) | Al2O3 (%) | CaO (%) | MgO (%) | Others (%) |
| Iron Oxide | 330 | 2.64 | 66.2 | 0.0 | 0.0 | 3.3 | 0.4 | 1.8 | 0.2 | 28.1 |
| DRI | 250 | 2.00 | 86.1 | 81.8 | 5.0 | 4.3 | 0.5 | 2.3 | 0.3 | 1.5 |
| Hot Metal | 220 | 1.76 | | 95.5 | 4.5 | | | | | |
| Slag | 30 | 0.24 | | | | | | | | |

TABLE II

Gas Balance around DRI Melting Furnace

| | Down Flow from Shaft Furnace to DRI Melting Furnace | Evolved Gas Generated in DRI Melting Furnace | Offgas Exhausted from DRI Melting Furnace |
|---|---|---|---|
| Flow rate (Nm3/h) | 1,900 | 4,500 | 6,400 |
| Flow rate (Nm3/ton-DRI) | 7.6 | 18.0 | 25.6 |
| Temperature (° C.) | 700 | 1,500 | 1,260 |
| Gross Calorific Value (kcal-HHV/Nm3) | 2,770 | 3,020 | 2,950 |
| Enthalpy (kcal/Nm3) | 240 | 520 | 440 |
| Chemical Energy (Gcal/h) | 5.2 | 13.6 | 18.8 |
| Sensible Energy (Gcal/h) | 0.4 | 2.4 | 2.8 |

To reduce 1 ton of the iron oxide, around 500 Nm3/t-DRI of H2+CO is required while most of the offgas from the DRI melting furnace 12 is CO and H2, which means the offgas from the DRI melting furnace 12 values 25 Nm3/t-DRI of H2+CO or 5% of H2+CO required to reduce the iron oxide. In comparison, the total energy (chemical+sensible) is 21.6 Gcal/h=0.08 Gcal/t-DRI, which corresponds to around 3% of the natural gas consumption at DR plant. This energy consumption shows it is more advantageous to recycle the offgas from the DRI melting furnace 12 to use as the reducing agent for the shaft furnace than to use it as fuel elsewhere.

Although the present invention is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are contemplated thereby, and are intended to be covered by the following claims. Additionally, all elements and features described herein may be used in any combination in embodiments.

What is claimed is:

1. A direct reduction process comprising:
providing a shaft furnace of a direct reduction plant to reduce iron oxide with reducing gas;
providing a direct reduced iron melting furnace;
coupling a discharge chute between a discharge exit of the direct reduced shaft furnace and an inlet of the direct reduced iron melting furnace; wherein direct reduced iron and the reducing gas from the shaft furnace flow through the discharge chute directly to the directed reduced iron melting furnace and the reducing gas controls the melting furnace atmosphere to reducing environment; and
providing an interconnecting duct between the direct reduced iron melting furnace and the shaft furnace to recycle all offgas from the melting furnace directly to at least one of the shaft furnace and a top scrubber of the direct reduction plant, wherein the melting furnace is an electric arc furnace or a submerged arc furnace.

2. The direct reduction process of claim 1, wherein the discharge chute comprises a direct reduced iron discharge chute and a direct reduced iron feed chute.

3. The direct reduction process of claim 1, further comprising providing a choke feed discharge chute to transfer the direct reduced iron to make a pile according to an angle of repose in the direct reduced iron melting furnace.

4. The direct reduction process of claim 1, wherein offgas from the direct reduced iron melting furnace is recycled in at least one of the following offgas recycle lines: a recycle line from the direct reduced iron melting furnace to the shaft furnace between a shaft furnace bustle and top of burden, a recycle line from the direct reduced iron melting furnace to a top of the shaft furnace, and a recycle line from the direct reduced iron melting furnace to a top gas scrubber.

5. The direct reduction process of claim 4, comprising providing a rotary feeder or a feed screw at the chute to control feed rate of the direct reduced iron from the shaft furnace to the direct reduced iron melting furnace.

6. The direct reduction process of claim 4, comprising providing a pressure control damper in at least one of the offgas recycle lines to control internal pressure of the direct reduced iron melting furnace and connection of cold dilution gas at offgas offtake of the direct reduced melting furnace, wherein the cold dilution gas is removed from at least one of the following cold gas sources at the direct reduction plant: an outlet of a reformed gas cooler; an outlet of a direct recycle cooler; and an outlet of a process gas compressor; and wherein offgas from the direct reduced iron melting furnace is diluted by the cold dilution gas to lower the offgas temperature at the furnace offgas offtake to prevent dust from building up in the off gas recycle lines.

7. The direct reduction process of claim 6, wherein coal or other carbonaceous material is injected into the direct reduced iron melting furnace and a portion of the cold gas is used to pneumatically convey the coal or other carbonaceous material into the direct reduced iron melting furnace.

8. The direct reduction process of claim 6, wherein a portion of the cold gas is used as seal gas for dynamic sealing around the direct reduced iron melting furnace, such as a pressure equalizing gas at a lock hopper to charge the flux and/or carbonaceous material to the direct reduced iron melting furnace.

9. The direct reduction process of claim 4, comprising providing a hot reducing gas line from a reformer outlet to the direct reduced iron melting furnace to control internal pressure of the direct reduced melting furnace.

10. The direct reduction process of claim 4, comprising providing a wet scrubber to clean and cool the offgas from the direct reduced iron melting furnace, and a pressure control damper and/or a compressor to control internal pressure of the direct reduced iron melting furnace, and located in the offgas recycle line from the direct reduced iron melting furnace to the shaft furnace.

11. The direct reduction process of claim 4, wherein flux is added in oxide pellets before being charged into the shaft furnace.

12. The direct reduction process of claim 1, wherein the direct reduced iron melting furnace operates at positive pressure, at least 0.3 barg.

13. The direct reduction process of claim 1, wherein the direct reduced iron melting furnace operates at positive pressure, greater than 1.3 barg.

14. The direct reduction process of claim 1, wherein slag and hot metal are tapped from the direct reduced iron melting furnace using separate tapping holes or the slag and hot metal are tapped from the same tap hole.

15. A direct reduction system comprising:
a shaft furnace of a direct reduction plant configured to reduce iron oxide with reducing gas;
a direct reduced iron melting furnace;
a discharge chute coupled between a discharge exit of the direct reduced iron shaft furnace and an inlet of the direct reduced iron melting furnace; wherein the direct reduced iron and the reducing gas from the shaft furnace is configured to flow through the discharge chute directly to the direct reduced iron melting furnace and the reducing gas controls the direct reduced iron melting furnace atmosphere to reducing environment; and an interconnecting duct between the direct reduced iron melting furnace and the shaft furnace configured to recycle all offgas from the melting furnace directly to at least one of the shaft furnace and a top scrubber of the direct reduction plant, wherein the melting furnace is an electric arc furnace or a submerged arc furnace.

16. The direct reduction system of claim 15, wherein offgas from the direct reduced iron melting furnace is configured to be recycled in at least one of the following off gas recycle lines: a recycle line from the direct reduced iron melting furnace to the shaft furnace between a shaft furnace bustle and top of burden, a recycle line from the direct reduced iron melting furnace to a top of the shaft furnace, and a recycle line from the direct reduced iron melting furnace to a top gas scrubber.

17. The direct reduction system of claim 16, comprising a rotary feeder or a feed screw installed at the discharge chute and configured to control feed rate of the direct reduced iron from the shaft furnace to the direct reduced iron melting furnace.

18. The direct reduction system of claim 16, comprising a choke feed discharge chute configured to transfer the direct reduced iron to make a pile according to an angle of repose in the direct reduced iron melting furnace.

19. The direct reduction system of claim 16, comprising a pressure control damper in at least one of the offgas recycle lines configured to control internal pressure of the direct reduced iron melting furnace and connection of cold dilution gas at offgas offtake of the direct reduced melting furnace, wherein the cold dilution gas is configured to be removed from at least one of the following cold gas sources at the direct reduction plant: an outlet of a reformed gas cooler; an outlet of a direct recycle cooler; and an outlet of a process gas compressor.

20. The direct reduction system of claim 16, comprising a hot reducing gas line from a reformer outlet to the direct reduced iron melting furnace configured to control internal pressure of the direct reduced iron melting furnace.

21. The direct reduction system of claim 16, comprising a wet scrubber configured to clean and cool the offgas from the direct reduced iron melting furnace, and a pressure control damper and/or a compressor configured to control internal pressure of the direct reduced iron melting furnace, and located in the offgas recycle line from the direct reduced iron melting furnace to the shaft furnace.

22. The direct reduction system of claim 15, wherein the discharge chute comprises a direct reduced iron discharge chute and a direct reduced iron feed chute.

23. A process to produce high performance iron including cast iron or hot metal with a direct reduction plant integrated with a direct reduced iron melting furnace comprising:

charging direct reduced iron directly from the shaft furnace to the direct reduced iron melting furnace through an interconnecting chute;

controlling the melting furnace atmosphere to reducing environment by introducing reducing gas from the shaft furnace to the direct reduced iron melting furnace through the interconnecting chute directly to the direct reduced iron melting furnace; and recycling all offgas from the direct reduced iron melting furnace directly to at least one of the shaft furnace and a top scrubber of the direct reduction plant through the interconnecting duct between the direct reduced iron melting furnace and the shaft furnace.

\* \* \* \* \*